United States Patent [19]

Gerakios

[11] Patent Number: 5,360,541
[45] Date of Patent: Nov. 1, 1994

[54] MODULAR DEVICE FOR THE EASE OF USE AND INSTALLATION OF FILTRATION TEXTILES

[75] Inventor: Michael Gerakios, Wamberal, Australia

[73] Assignee: Albany International Corp., Albany, N.Y.

[21] Appl. No.: 81,990

[22] Filed: Jun. 24, 1993

[51] Int. Cl.⁵ .............................................. B01D 29/54
[52] U.S. Cl. ................... 210/232; 210/346; 210/486
[58] Field of Search ............... 210/232, 238, 331, 346, 210/486

[56] References Cited

U.S. PATENT DOCUMENTS

| | | | |
|---|---|---|---|
| 1,812,725 | 6/1931 | Stanley et al. | 210/486 |
| 2,023,910 | 12/1935 | Bacheldor | 210/486 |
| 2,028,466 | 1/1936 | Moran | 210/486 |
| 2,104,473 | 1/1938 | Watson | 210/486 |
| 2,409,705 | 10/1946 | Reinhardt | 210/486 |
| 3,485,375 | 12/1969 | Lee . | |
| 4,330,405 | 5/1982 | Davis et al. | 210/351 |
| 5,084,174 | 1/1992 | Perala et al. | 210/486 |

Primary Examiner—Robert A. Dawson
Assistant Examiner—W. L. Walker
Attorney, Agent, or Firm—Kane, Dalsimer, Sullivan, Kurucz, Levy, Eisele & Richard

[57] ABSTRACT

A modular table filter for a circular horizontal rotating table filter includes a number of sections which may be assembled on the support frame thereof. The sections are annular-sector-shaped and, when assembled, form an annulus on the table filter. Each section, in turn, may be broken down into an outer subsection and an inner subsection. Filtration fabric, or textile, may be placed on top of the outer subsection, and secured therein by the inner subsection, which is designed to lock thereinto. Alternatively, each section may be an integral annular-sector-shaped frame having a peripheral groove or channel. Filtration textile may be placed on top of the frame, and over the groove or channel, and wedges driven thereinto to hold the fabric tautly across the frame. The modular table filter greatly simplifies the replacement of the filtration fabric, as the sections holding fabric needing replacement may be removed easily and replaced by ones having fresh filtration textiles without the need for isolating the table filter for an inordinately long time.

6 Claims, 4 Drawing Sheets

MODULAR DEVICE FOR THE EASE OF USE AND INSTALLATION OF FILTRATION TEXTILES

BACKGROUND OF THE INVENTION

1. Field of the Invention

The present invention relates to a circular horizontal rotating table filter, and, more specifically, is concerned with a modular device designed to facilitate the installation and replacement of filtration textiles thereon.

2. Description of the Prior Art

Circular horizontal rotating table filters are known in the art. As shown, for example, in U.S. Pat. No. 3,485,375 to Lee, which is incorporated herein by reference, a table filter has radial vertical partitions subdividing it into sector-shaped individual filtration chambers adjoining one another around a central hub portion, or center island portion, which is part of the rotating table structure. The table filter, as a whole, may have a diameter in the range from 15 feet to 25 feet.

It should be understood that in a conventional table filter, the mounting of the sector-shaped filter media comprises the so-called divider strips or channel members extending radially along, and supported by, the horizontal top faces of respective radial partitions. The inner ends and the outer ends of the divider strips are interconnected respectively by inner and outer arcuate channel members, the inner channel members hugging the center island portion, or center island, the outer channel members following the curvature of the peripheral boundary wall of the filter table. A sector-shaped channel frame thus defines the boundary of each effective sector-shaped filter area, with the filter media itself edgewise secured in this channel frame. Corresponding sector-shaped perforated backing plates or panels usually support the filter media, and are in turn supported by rigid grid structures and ledges provided in the respective filtration chambers. There may be a total of twenty (20) such sector-shaped filter areas making up the entire table filter. That is to say, the circular table filter may be divided into twenty sector-shaped filter areas.

The present application is concerned with the replacement, when necessary, of the filter media itself. At present, to carry out such replacement, the entire table filter must be isolated for a considerable length of time, while the filter media in all or several of the sector-shaped filter areas are replaced. In each filter area, as noted above, the filter medium is held edgewise within a channel which extends around the periphery thereof. The filter medium is secured in a taut fashion within each filter area by means of caulking ropes, which must be driven manually into the peripheral channel. This is a labor-intensive operation, usually accomplished by hand-hammering the caulking ropes into the channels, which requires many hours, during which, of course, the table filter may not be used.

The present invention has as an object to reduce this production down time, while the filter media are being replaced. At the same time, a secondary or concomitant object is to avoid the significant potential risk to operator injury which accompanies the replacement of the filter media by the method presently used.

SUMMARY OF THE INVENTION

Accordingly, the present invention is a modular device including a plurality of sections which, when assembled together, make up an annulus of an area corresponding to that of the portion of the table filter outward from the center island, in which portion the filter media are located. Each section of the plurality making up the annulus may correspond to an annular-sector-shaped filter area of the table filter. As a consequence, the annulus may include twenty such sections in all. Each section may be attached to its neighbors on either side by fastening means, which may include male and female locking components as an integral part of each section. The annulus assembled from these sections is designed to be set on top of the existing support frame of the rotating table filter or may be used to replace the existing rotating table filter entirely.

In one embodiment of the present invention, the individual sections are designed to hold a filtration textile by being separable into an inner subsection and an outer subsection. The design and fit of the inner and outer subsection would be dictated by the physical characteristics of the filtration textile used. For example, in preparing each section of the modular device, a filtration textile is laid taut over the outer subsection and the inner subsection is pressed therewithin. The inner subsection may be held within the outer subsection by fastening means, which may include male and female locking components as an integral part of each subsection.

Once a filtration textile has been loaded into each section, the required number are set atop the support frame of the table filter, and pressed together until the annulus is complete.

In an alternate embodiment of the present invention, each section may have a groove or channel extending peripherally about a surface thereof. If the physical characteristics of the filtration textile being used permit, the filtration textile may be laid over the section, and wedges of a suitable material driven into the groove or channel to hold the fabric tautly in place in the section.

Wedges may also be used, once the sections have been set on top of the existing support frame of the rotating table filter, or another support structure, and have been engaged therewith, to lock the sections in place thereon.

That the annulus formed by the individual sections, each having a filtration textile, can be broken down and taken piece-by-piece to a workplace away from the table filter, where a replacement filtration textile may be installed in each section at a later time, can provide a great economic benefit. A replacement set of sections, previously prepared for the purpose, can be installed on the support frame for the table filter immediately following the removal of those needing replacement to reduce production down time to several hours, which is a fraction of the amount of time required to replace the filter media under the methods currently used.

The present modular device may be constructed of any of a variety of lightweight metals, plastics, high density polymers or other materials, the choice in a given situation being governed by the physical conditions under which the device is to be used. For example, if the table filter is operated in an environment of high temperature, or in the presence of corrosive chemicals, the material from which the present modular device is constructed may be chosen accordingly.

The present invention will now be described in more complete detail with frequent reference being made to the figures identified below.

DETAILED DESCRIPTION OF THE PREFERRED EMBODIMENT

Figure 1:
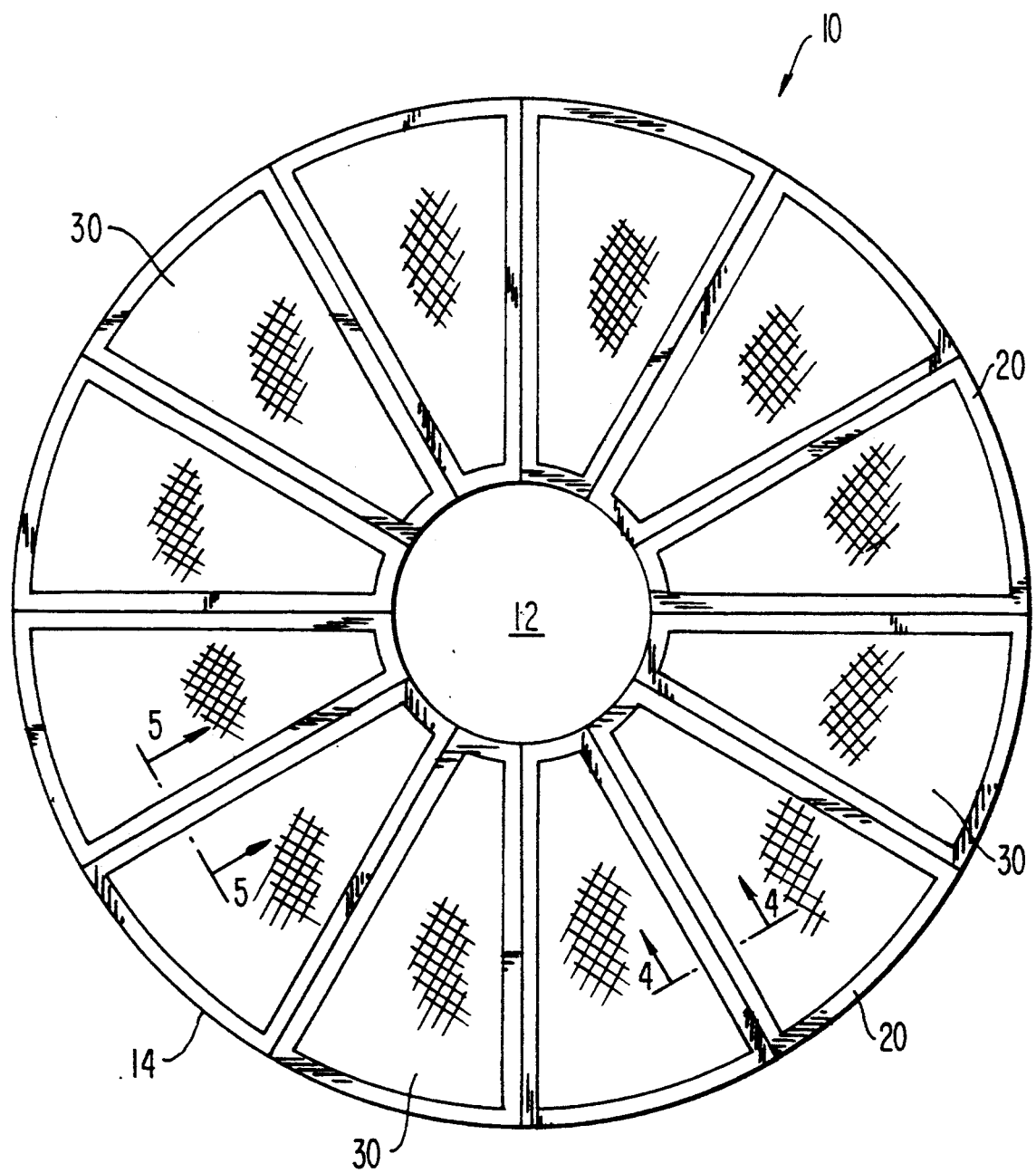
FIG. 1 is a top plan view of a fully assembled modular table filter of the present invention.

With reference now to the figures, FIG. 1 shows a top plan view of a fully assembled modular table filter 10 of the present invention. As shown, the fully assembled device takes the form of an annulus, whose center 12 corresponds to the center island of the table filter apparatus on which it is designed to sit. The outer periphery 14 of the annulus corresponds to that of the table filter support structure.

The modular table filter 10 comprises a plurality of annular-sector-shaped sections 20, of which twelve are shown for the purpose of illustration. A modular table filter may include a larger or smaller number of sections, although twenty is a typical number.

Figure 2:
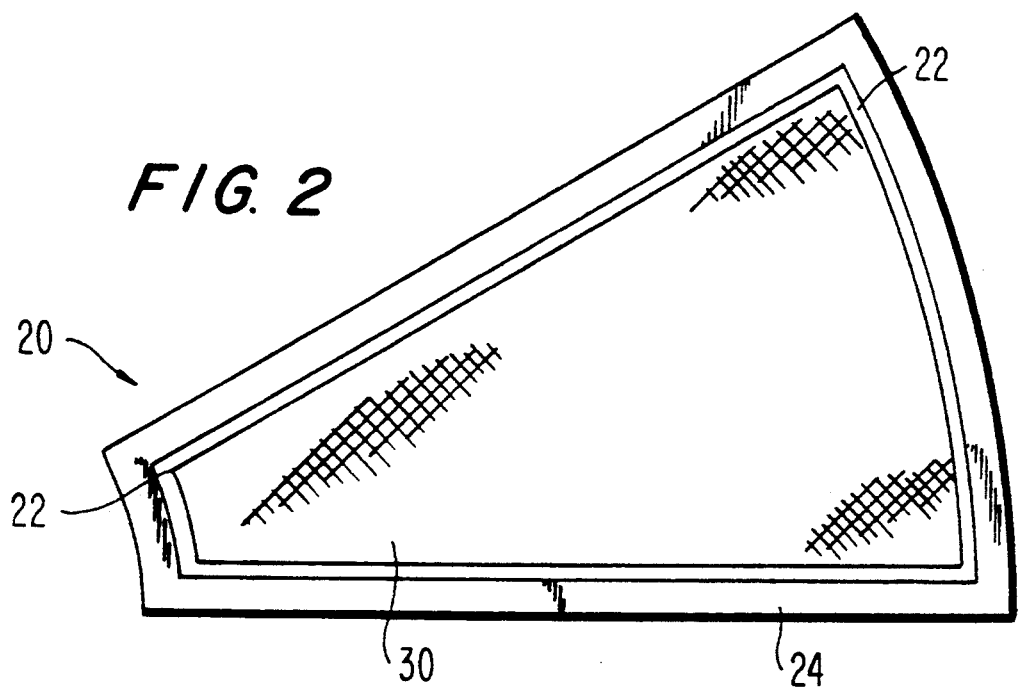
FIG. 2 is a top plan view of a section of the modular table filter for one embodiment of the present invention.

Each section 20 includes a filtration textile, or fabric 30, which is held tautly therewithin. A section 20 is shown in a top plan view, enlarged by comparison to that provided in FIG. 1, in FIG. 2 for one embodiment of the present invention. There, section 20 is shown to include an inner subsection 22 and an outer subsection 24.

A filtration textile 30 is held within section 20 between the inner subsection 22 and the outer subsection 24. The filtration textile 30 is held tautly over the outer subsection 24 while the inner subsection 22 is snapped thereinto to carry this out. The inner subsection 22 and the outer subsection 24 are provided with complementary fastening means so that one may be locked into the other.

Figure 3:
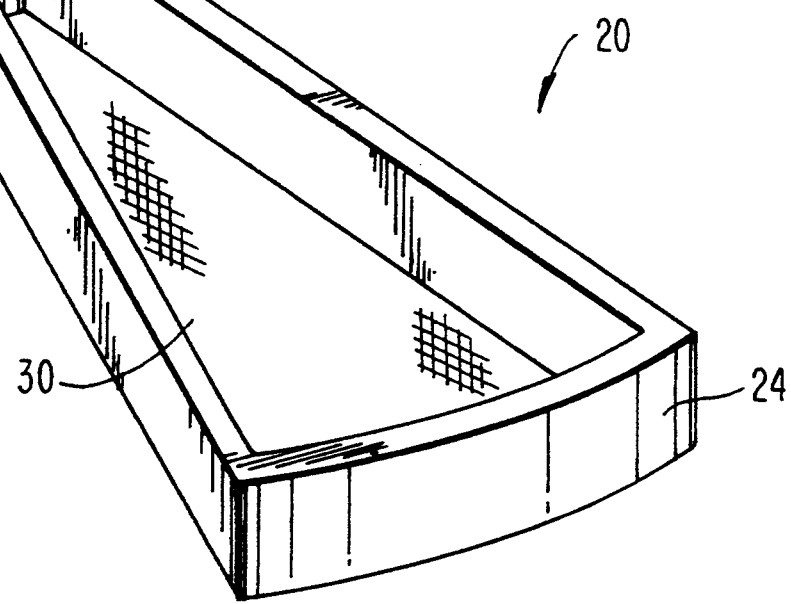
FIG. 3 is a perspective view of the underside of the section shown in FIG. 2.

FIG. 3 presents a perspective view of the underside of section 20, where the fabric 30 is held on the upper side thereof by the inner subsection 22, not visible in the figure.

Figure 4:
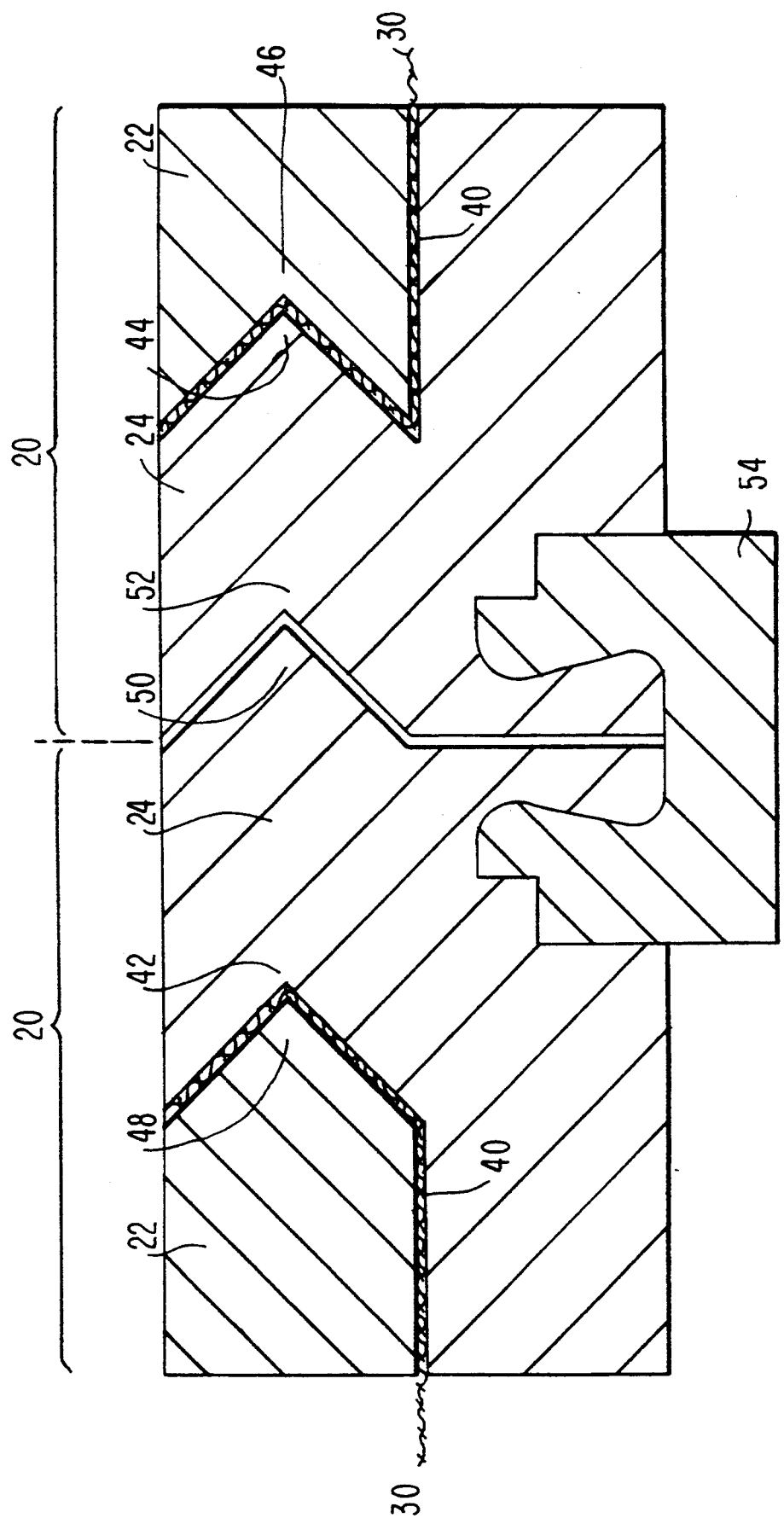
FIG. 4 is a cross section of one embodiment of the fully assembled modular table filter taken as indicated by line 4—4 in FIG. 1.

FIG. 4 is a cross section of the fully assembled modular table filter 10 taken as indicated by line 4—4 in FIG. 1. As is indicated, the cross section has been taken where two sections 20 abut against each other. Referring to section 20 on the left-hand side of the figure, an inner subsection 22 is shown fastened to an outer subsection 24. A filtration textile 30 is clamped between the two in the manner shown.

The other side of a given section 20 is illustrated in the right-hand side of the figure. It should be understood that, when installing a filtration textile 30 into a section 20, one side of the inner subsection 22 may be inserted first into the outer subsection 24, and then the other side is snapped down to hold fabric 30 in place.

The outer subsection 24 has a ledge 40 which supports the opposite sides of inner subsection 22. One ledge 40 of the outer subsection 24 is provided with a female locking component 42, while the other ledge is provided with a male locking component 44. The inner section 22, complementarily, is provided with a female locking component 46 on one side and a male locking component 48 on the other side. When being secured into the outer subsection 24, the female locking component 46 may first be disposed on the male locking component 44, then the male locking component on the far side of the inner subsection 22 may be snapped into the female locking component 42 of the outer subsection 24.

In a similar fashion, sections 20 may be connected to one another by fastening means on the outer surfaces of the radial members of the outer subsections 24. As shown in FIG. 4, the outer subsection 24 of the section 20 on the left has a male locking component 50 which is complemented by a female locking component 52 on the outer subsection 24 on the right. In addition, the sections 20 may be held together by including means whereby the outer subsections 24 may be engaged with the support frame member 54 of the filter table.

Figure 5:
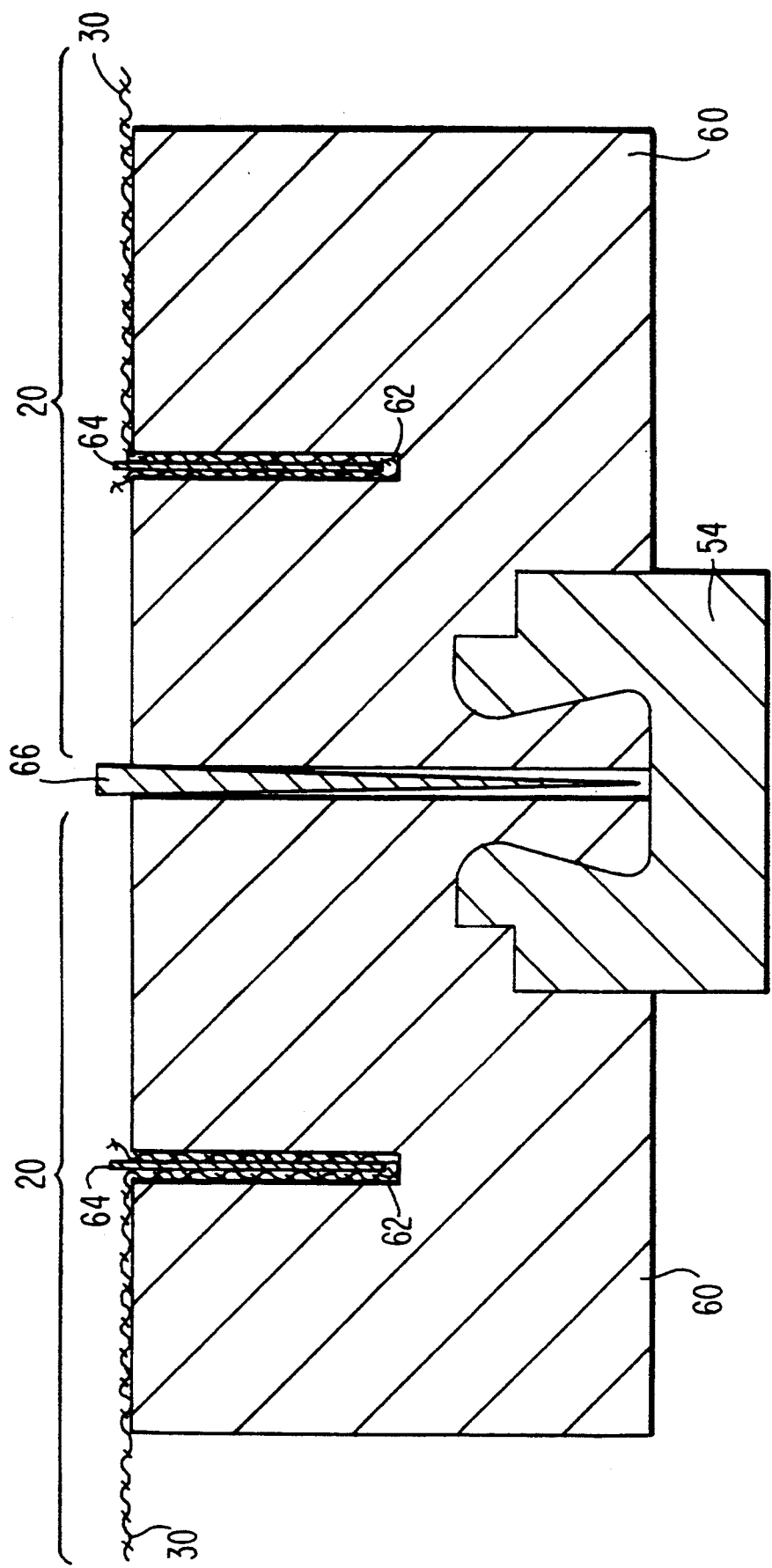
FIG. 5 is a cross section, taken as indicated by line 5—5 in FIG. 1, of an alternate embodiment of a fully assembled modular table filter of the present invention.

FIG. 5 is a cross section, taken as indicated by line 5—5 in FIG. 1, of an alternate embodiment of a fully assembled modular table filter of the present invention. Again, the cross section has been taken where two sections 20 abut against each other, but, in this alternate embodiment, there are no inner subsections 22 and outer subsections 24. Instead, each section 20 comprises an integral annular-sector-shaped frame 60. In FIG. 5, the right-hand side of one annular-sector-shaped frame 60 is shown next to the left-hand side of an adjacent annular-sector-shaped frame 60.

Each annular-sector-shaped frame 60 is provided with a groove or channel 62 extending peripherally about the upper surface thereof. A filtration textile 30 is held tautly in place across each annular-sector-shaped frame 60 by wedges 64, made of suitable material, which, when the filtration textile 30 is laid over the frame 60, are driven into the groove or channel 62 to hold the filtration textile 30 tightly thereacross.

Further, the sections 20 may be held in place by including means whereby the annular-sector-shaped frames 60 may be engaged with the support frame member 54 of the filter table. Once they are so engaged, wedges 66 of a suitable material may be driven between adjacent annular-sector-shaped frames 60 to lock them in place on the support frame member 54.

Modifications to the above would be obvious to those of ordinary skill in the art, but would not bring the invention so modified beyond the scope of the appended claims.

What is claimed is:

1. A modular table filter, said modular table filter having the form of an annulus assembled from a plurality of annular-sector-shaped sections, each of said sections comprising a filtration textile and means for holding said filtration textile tautly thereacross, wherein each of said annular-sector-shaped sections comprises an outer subsection and an inner subsection fitting therewithin, each outer subsection having a first radial member and a second radial member, said first radial member and said second radial member having an inner surface within said annular-sector-shaped section and an outer surface without said annular-sector-shaped section, said inner surface having a ledge, so that said inner subsection may be supported within said outer subsection between said first radial member and said second radial member thereof, said ledge being provided with fastening means to secure said inner subsection within said outer subsection, said inner subsection also having a first radial member and a second radial member, said first radial member and said second radial member having outer surfaces with fastening means engageable with said inner surface of said first and second radial members of said outer subsection, and said outer surfaces of said first radial member and said second radial member of said outer subsection having fastening means for connection with second and first radial members of outer subsections of adjacent annular-sector-shaped sections, respectively, to complete said annulus, and wherein said means for holding said filtration textile tautly across said annular-sector-shaped sections is the fastening of said inner subsection within said outer subsection over said filtration textile.

2. A modular table filter as claimed in claim 1, wherein said fastening means on said outer surface of one of said first radial member and said second radial member of said outer subsection is a male locking component, and said fastening means on said outer surface of the other of said first radial member and said second radial member of said outer subsection is a female locking component engageable with said male locking component.

3. A modular table filter as claimed in claim 1, wherein said fastening means on said ledge on said inner surface of one of said first radial member and said second radial member of said outer subsection is a male locking component, and said fastening means on said ledge on said inner surface of the other of said first radial member and said second radial member of said outer subsection is a female locking component.

4. A modular table filter as claimed in claim 3, wherein said fastening means on said outer surface of one of said first radial member and said second radial member of said inner subsection is a male locking component engageable with said female locking component on said ledge on said inner surface of one of said first radial member and said second radial member of said outer subsection, and said fastening means on said outer surface of the other of said first radial member and said second radial member of said inner subsection is a female locking component engageable with said male locking component on said ledge on said inner surface of the other of said first radial member and said second radial member of said outer subsection.

5. A modular table filter, said modular table filter having the form of an annulus assembled from a plurality of annular-sector-shaped sections, each of said sections comprising a filtration textile and means for holding said filtration textile tautly thereacross, wherein each of said annular-sector-shaped sections comprises an annular-sector-shaped frame, said frame having a peripheral channel with parallel walls extending thereabout on a surface thereof, and wherein said means for holding said filtration textile tautly across said annular-sector-shaped sections is at least one wedge, placed above said filtration textile and driven into said channel.

6. A modular table filter as claimed in claim 5 further comprising a plurality of wedges, one of said wedges being between each of said annular-sector-shaped sections, to hold said annular sector-shaped sections in place relative to one another.

* * * * *